United States Patent Office 3,544,896
Patented Dec. 1, 1970

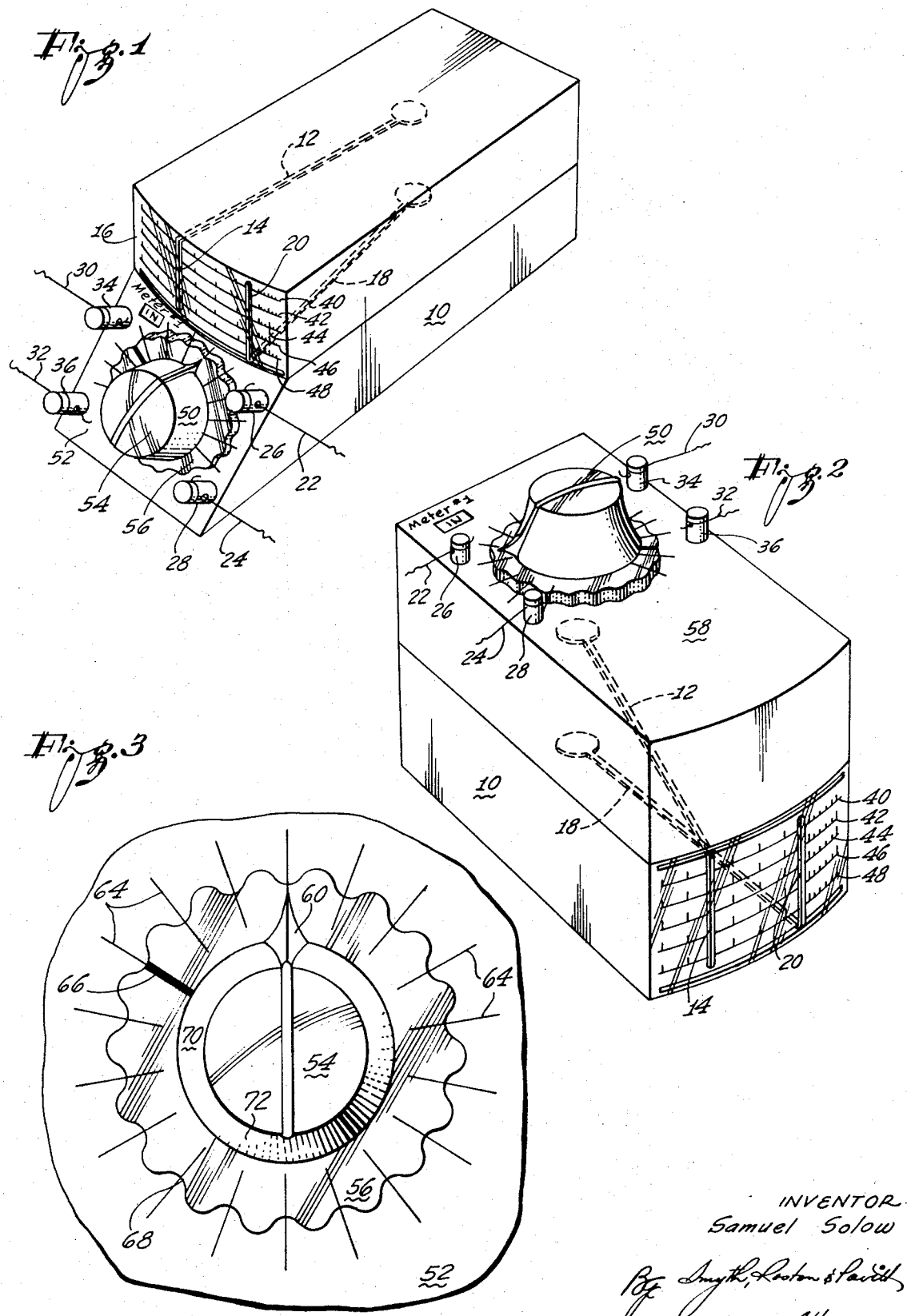

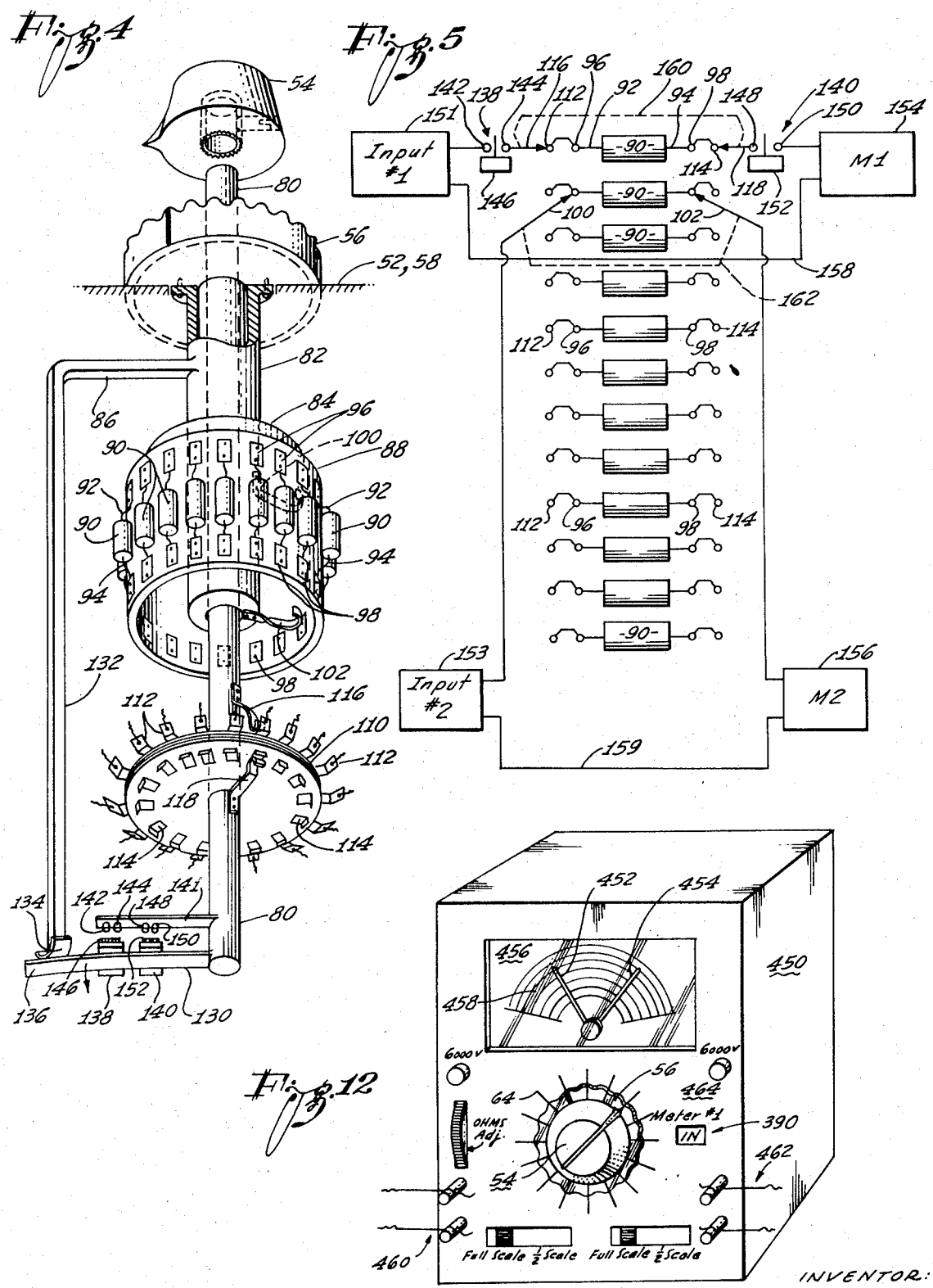

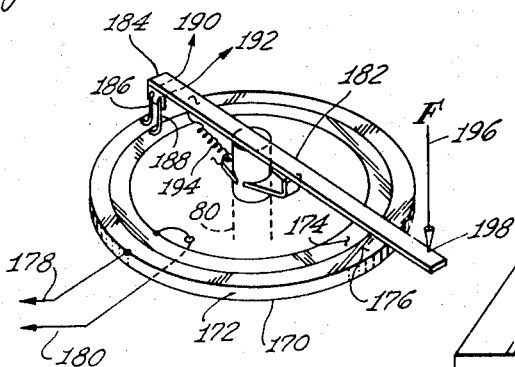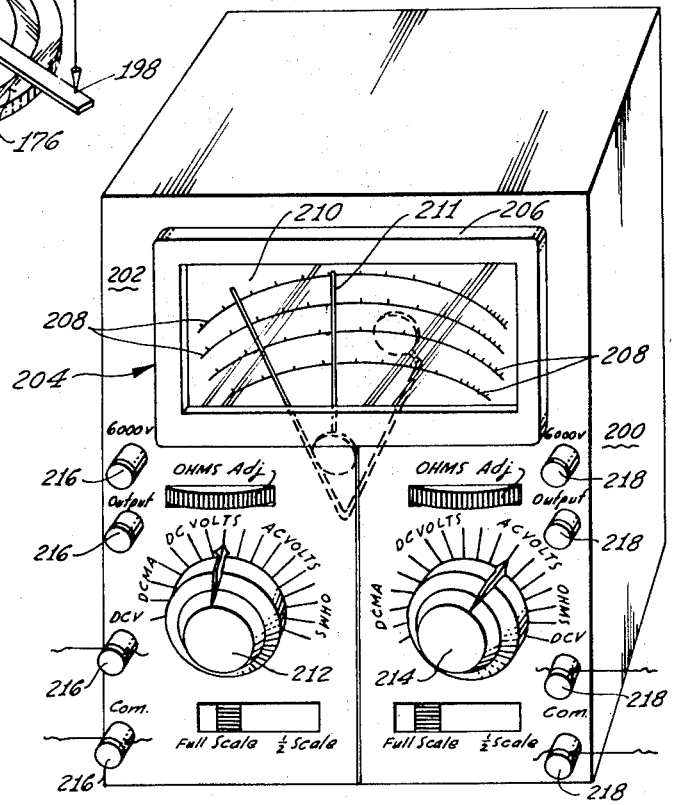

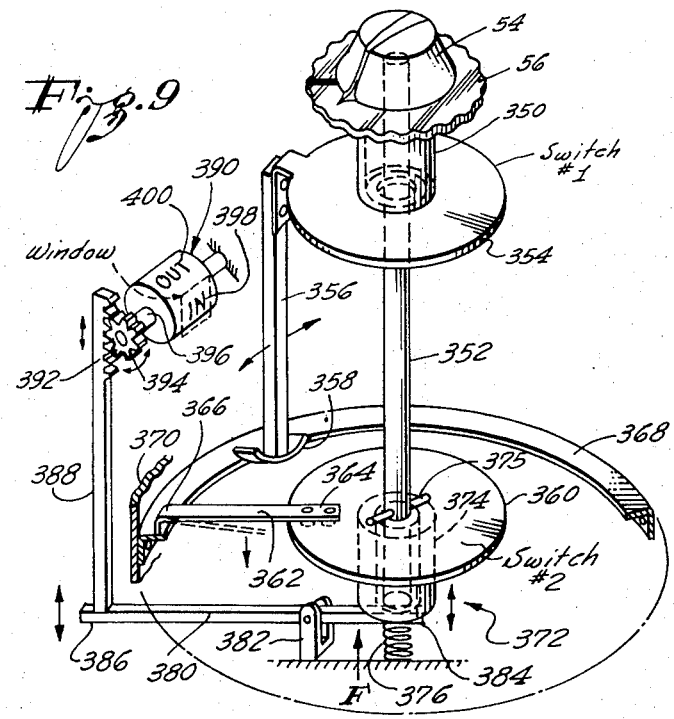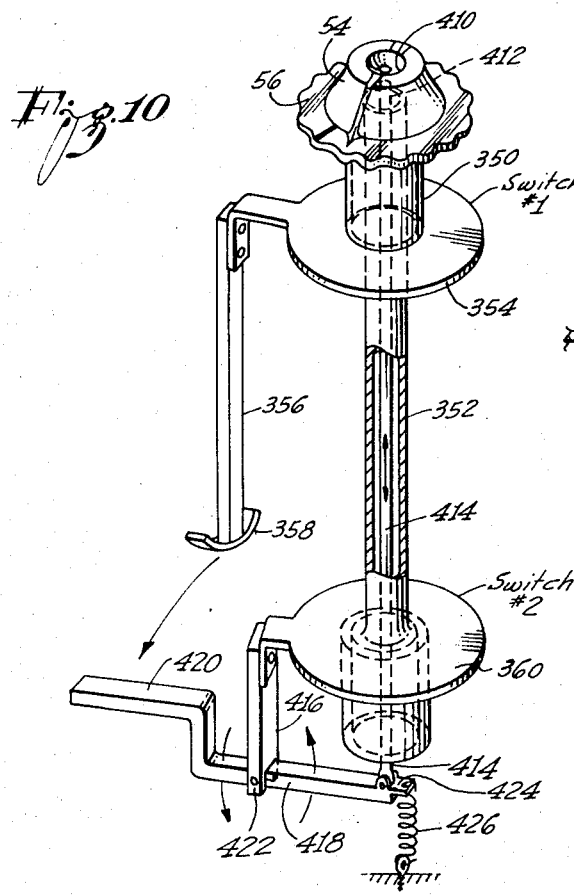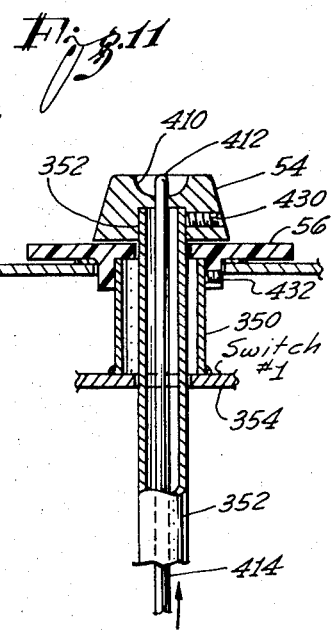

3,544,896
METER ARRANGEMENT FOR SIMULTANEOUSLY PROVIDING AT LEAST A PAIR OF INDEPENDENT INDICATIONS
Samuel Solow, 5451 Eau Claire Drive,
Rolling Hills, Calif. 90274
Filed Dec. 22, 1965, Ser. No. 515,529
Int. Cl. G01r *15/08*
U.S. Cl. 324—115
16 Claims

ABSTRACT OF THE DISCLOSURE

This invention relates to a system for simultaneously providing at least a pair of independent indications. The pair of indications are obtained by selecting individual ones of a plurality of impedances to control the sensitivity of the indications. When the same impedance is selected for each of the indications in the pair, means are provided for breaking the circuit providing one of the indications so that only the other indication is obtained.

---

This invention relates to electrical meters and more particularly to improvements upon dual electrical meters of the sort described in U.S. application, Ser. No. 204,334 filed on June 22, 1962, in the name of the present applicant, Samuel Solow.

The above-cited application, Ser. No. 204,334 provided improvements in the type of electrical meter wherein the value of an electrical signal is converted into a readout by transducing the electrical signal into a mechanical movement. The mechanical movement should be such as to cause an indicator, such as a pointer, to move along the scale in proportional and accurate response to a relevant characteristic of the electrical signal being transduced. Ordinarily the scale would have readable indicia marked on it, so that an operator of the electrical meter could read the value of the electrical signal therefrom. As the readout indicator is moved by the electrical-mechanical transducer portion of the meter across the scale, it points to various of the indicia and thereby indicates the instantaneous value of the signal being monitored. The improvement provided by application Ser. No. 204,334 related to the presentation of more than one readout on the same scale or meter face by locating the transducer portions of meters approximate to one another and shaping their readout indicators such that they register on the same scale or instrument face.

The great value of such an improvement and of the improvements to be provided by the instant invention are that they permit the personnel reading the improved meters to read several alternative values without losing sight of any of the indicator needles registering these values. This permits ready comparison between two signals, and also ensures that none of the outputs involved change while the operator is directing his attention to one of the other outputs. Another advantage of uniting the readout faces of a number of electrical meters is that the instrument panel for displaying all these readout faces is made correspondingly smaller and less confusing. The broad object of the instant invention is to continue the development of unification and compression of electrical meters by extending the component-sharing concepts of application, Ser. No. 204,334 to their sensitivity adjustment knobs and other such controls. Another object is to cut down on the bulk and expense of such electrical instruments by uniting the sensitivity controls of several meters into one component-sharing unit.

In the achievement of the above and other objects and as a feature of the instant invention there is provided an improved electrical meter system having two or more meters joined according to the principles of the above-cited application, Ser. No. 204,334 and having in addition a unified sensitivity control for said meters. The sensitivity control has a plurality of knobs which may or may not be mounted coaxially and has a single resistor bank associated with the knobs. In order that each resistor in the resistor bank may be connected in series with any of the meters involved, a separate set of contact means is provided to selectively connect each separate control knob with both ends of each sensitivity resistor. The effect, therefore, of the unified sensitivity control is that each said control knob can be rotated independently to connect one resistor into circuit with the meter associated with that knob.

Because neither of the resistors in the resistor bank nor the meters associated with the separate knobs are electrically connected to each other, the several meters may use different resistors in the resistor bank simultaneously with no adverse effects on their operation. The one limitation imposed by the unified sensitivity control is that no two meters may be connected to the same resistor simultaneously.

As another feature of the instant invention if it is desired to use one or more meters in the inventive system with the same resistor in the sensitivity control resistor bank, there is provided in series with each meter between the meter and the movable contact for providing electrical connection with the resistors an isolation switch, preferably a manually-actuatable switch or a circuit breaker which temporarily keeps one meter out of circuit with the resistor to be used in common. Other more specific features of the instant invention include principles for the arrangement of the control knobs and other parts of a dual electrical system having unified sensitivity control, the electrical wiring therein, the power supply system therein, and the arrangement of the display faces, indicators and control knobs thereof.

Other objects and features of the instant invention and a better understanding thereof may be had by referring to the following description and claims taken in conjunction with the accompanying drawings in which:

FIG. 1 is a perspective view of a first embodiment of the instant invention;

FIG. 2 is a perspective view of a second embodiment of the instant invention;

FIG. 3 is a closeup plan view of a dual electrical meter selector switch knob of the sort shown in either FIG. 1 or FIG. 2;

FIG. 4 is an exploded perspective view of a dual electrical meter selector switch according to the principles of the instant invention;

FIG. 5 is an electrical schematic illustrating functionally the performance of the selector switch of FIG. 4;

FIG. 6 is a perspective view of another embodiment of the disabling circuit principles disclosed herein;

FIG. 7 is a perspective view of a dual electrical meter including separate selector switches according to the principles of the instant invention;

FIG. 8 shows several arrangements of the indicator needles and scale and protective faces of the dual electrical meter of FIG. 7;

FIG. 9 shows in perspective a first embodiment of the disabling circuit indicator principles of the instant invention;

FIG. 10 shows in perspective a second embodiment of the disabling circuit indicator principle of the instant invention;

FIG. 11 is a detail view in section of the indicator of FIG. 10; and

FIG. 12 is a perspective view of a dual electrical meter system according to the invention.

Referring to FIG. 1, a first meter in which the principles of the present invention might be embodied has a case 10 in which are mounted two meter movements (not shown) of the same sort as described in the above-cited application, Ser. No. 204,344. A first said movement imparts motion to an arm 12 having a pointer 14 positioned to move across an indicator face 16 of the meter of FIG. 1. A second such movement imparts motion to an arm 18 having a pointer 20 also positioned to move across the indicator face 16. The arms 12 and 18 and the pointers 14 and 20 are so positioned that they may both move to any portion of the indicator face 16 without interfering with one another. The pointers 14 and 20 are preferably of different colors (e.g., red and black) to reduce the possibility of confusion therebetween.

Movement of the arms 12, 18 is ultimately caused and conditioned by an input electrical signal applied to the meter movement associated with each said arm. Electrical signals to be indicated by the pointer 14 of the arm 12 are applied through two leads 22 and 24 to two connector posts 26 and 28 associated with the movement of the arm 12. In similar manner, input electrical signals to be indicated by the pointer 20 of the arm 18 are applied through electrical leads 30 and 32 to posts 34 and 36 associated with the movement of the arm 18. Rather than being directly connected to the movements associated with the arms 12, 18, the posts 26, 28, 34 and 36 are connected to a sensitivity adjustment whereby the input electrical signals may be attenuated to a selectable degree before being transduced in the mechanical movement. The purpose of this attenuation is to permit the tailoring of the indication on the face 16 to the finest of the scales 40, 42, 44, 46, and 48 on said face that is possible without exceeding the limits of the indication.

In order to perform this selectable attenuation, there is provided within the case 10 a sensitivity adjustment mechanism to be described in greater detail hereinafter. According to the principles of the instant invention the same sensitivity adjustment may be shared by both meter movements within the case 10. In the case of the dual meter of FIG. 1, a knob assembly 50 on the front face 52 of the case 10 serves to permit selection for both meters. In order to do this the knob assembly 50 is composed of two independently rotatable members 54 and 56. The rotatable member 54 selects the attenuating element to be associated with the movement of the pointer 14, while the rotatable member 56 selects the attenuating element to be associated with the movement of the pointer 20. In prior art meter arrangements it was unknown to have the same selector switch with a common set of electrical components capable of serving more than one meter movement at the same time.

Referring to FIG. 2, another dual electrical meter wherein the principles of the instant invention may be embodied has a case 10 as above, a face 16 with scales 40, 42, 44, 46, and 48 also as above, and arms 12 and 18 and indicator needles 14 and 20. However, the face 16 and the indicator needles 14 and 20 are placed near the bottom of the case 10, while the knob 50 for sensitivity selection is disposed upon a top surface 58 of the case 10. The binding posts 26, 28, 34, and 36 are also disposed on the top 50. From FIGS. 1 and 2 it can be seen that the sensitivity selection device to be described hereinafter provide great freedom in the disposition of the parts of a dual electric meter. Moreover, the dual electric meter of the sort shown in FIGS. 1 and 2, with only one attenuation assembly to provide all sensitivity adjustments is new with the instant invention.

Referring to FIG. 3, a plan view of the knob assembly 50 as used on the meters shown in both FIGS. 1 and 2 may have a knob-type device 54 for use in the position associated with pointer 14. The indexing disk 56 which is associated with the pointer 20 is made of transparent plastic so that a pointer 60 on the knob 54 can be oriented through, as well as over the edge of the disk 56 with the markings 64 which make up a common scale associated with both knobs 54 and 56 and the meter movements of the arms 12 and 18.

As was stated above, the knob 54 and the indexing disk 56 rotate independently, although coaxially. Thus while the knob 54 uses the scale marking 64 for orientation to indicate which attenuation device of the sensitivity selector to be discussed hereinafter is connected in circuit, the indexing disk 56 also orients with the scale marking 64, using a pointer 66 marked in the plastic of the disk 56. Rounded indentations 68 permit the ready use of fingers to prove non-slip actuation of the disk 56, while the knob 54 may be grooved on its sides 70 as shown at 72 for the same purpose or made oblong.

The broad concept of the instant invention is that the knob 54 will rotate contact points wired between a first source of electrical signals which it is desired to transduce into a mechanical readout and the meter movement associated with the arm 12. The function of the knob 54 is to switch the first input signal source through an attenuation element (typically, a resistor) and thence to the meter movement associated with the arm 12, hereinafter referred to as the first meter movement. At the same time, the second rotating device 56 is connected to other switchable contacts and so wired that it switches electrical signals from a second source through an attenuation resistor to the meter movement associated with the arm 18. According to one feature of the instant invention, the attenuation resistors used by both the knob 54 and the disk 56 are common to both, i.e., the first signal source and first meter movement and the second signal source and the second meter movement are enabled to share the same resistor bank by the arrangement taught herein.

It can be seen that a shared-resistor sensitivity switch for use in a dual meter of the sort taught in the above-cited application, Ser. No. 204,344, provides great advantages both in the saving of parts and manufacturing costs and also in permitting the size and weight of the overall meter system to be minimized. In addition it should be noted that the use of coaxial knobs as shown in FIG. 3 permits greater ease of operation.

If the above broad concept is to be practiced, however, there is one contingency which must be provided for: the situation when the knob 54 and the disk 56 have been turned to switch their respective input sources and meter movements through the same sensitivity-determining resistor. In such a situation, no worthwhile readout will be provided by either meter movement, because of the crosstalk and, indeed, the effective manifolding or adding of the two inputs from the first and second input signal sources. Several features of the instant invention to be described in detail hereinafter set forth the devices to automatically isolate one signal source and its corresponding meter movement from an attenuation resistor whenever the other signal source and its corresponding meter movement are also switched to that same resistor. In the alternative, of course, manually-actuatable isolation switches could be associated with both meters in the dual meter systems of FIG. 1 or 2, so that an operator could select which meter is deactivated while both meters are set to use the same attenuation resistor.

Referring to FIG. 4, the exploded perspective view therein shows a preferred sensitivity selector system for use with the dual electrical meters shown in FIGS. 1 and 2. It should be emphasized that more than two meters could share the same resistor bank, but only two are shown in FIG. 4 for the sake of clarity. At the outset, it will be noted that the transparent plastic disk 56 shown in FIG. 3 has been replaced with another analogous rotating device 56, which is intended to project through the surface 52 or 58 upon which the knobs 54 and 56 are to be mounted. When a projecting ring 56 is used on such a surface, one set of peripheral indicator markings on the surface 52 or 58 is sufficient for use by both rotatable devices 54 and 56 without the necessity of having any markings inside the radius of the transparent plastic type rotatable device 56. In addition, any possible parallax encountered by viewing through the transparent plastic type rotatable device 56 is eliminated. In fact, the rotatable device 56 could in this instance be opaque. Applicant has found that the knob system of FIG. 3 and the knob system of FIG. 4 are almost equally easy to manipulate and inexpensive to manufacture, so that either one works equally well in the practice of the instant invention.

In FIG. 4, the knob 54 is keyed to an inner shaft 80 which runs the length of the selector switch assembly. The ring 56 is keyed to an outer shaft 82 which passes through a bearing 84 but does not go the full length of the selector switch assembly. An arm 86 is connected to the outer shaft 82 and rotates therewith. The purpose of the arm 86 will be explained hereinafter.

Mounted on the bearing 84 is a drum 88, which may also be any suitable component carrying device. A bank of attenuation resistors 90 may be mounted on the drum 88. Alternatively, the resistors 90 may be mounted at some remote location, if only they are then wired to perform the function described for them. Each resistor 90 has a first lead 92 and a second lead 94. In the operation of the selector switch assembly it is intended that the first leads 92 of the resistors 90 be selectively connected to either the first input signal source or the second input signal source. Likewise, it is intended that the second leads 94 be selectively connected to the first or second meter movements. Accordingly, the leads 92 are each connected to their own separate contact point 96 which may be in the form of a bus, contact plate, or any other suitable device for making sliding connection. In like manner, the leads 94 are each connected to their own separate contact plates 98. Both the contact plates 96 and the contact plates 98 extend through the wall of the drum 88.

In order to selectively switch one of the resistors 90 into series between the second input signal source and the second meter movement, there are mounted on the shaft 82 two sliding contacts 100 and 102 which rotate with the arm 82, while the drum 88 is held stationary. Also referring to FIG. 5, the contact 100 is electrically connected to the second input signal source 153, while the contact 102 is electrically connected to the second meter movement 156. Thus as the ring 56 is rotated and the shaft 82 rotates with it, the contacts 100 and 102 make electrical connection with a pair of contact points 96, 98 to cause the resistor 90 associated with those points to be connected in series between the second input signal source and the second meter movement. Switching between the resistors 90 is accomplished for the first electrical input and the first meter movement by a wafer 110 or other such device having upper and lower surfaces and having the shaft 80 passing therethrough. A first set of electrical contacts 112 is mounted on the upper surface of the double wafer 110, while a second set of electrical contacts 114 is mounted on the lower surface of the wafer 110. There is no electrical connection between the upper contact 112 and the lower contact 114 of the double wafer 110. An upper contact 116 mounted to rotate with the inner shaft 80 is disposed to selectively contact each of the contact points 112. A lower contact 118 mounted to rotate with the shaft 80 is disposed to selectively contact each of the lower contact points 114. The upper contact points 112 are all connected to the respective first leads 92 of the resistors 90 via the contact points 96 on the drum 88, while the lower contact points 114 are in similar manner connected to respective second leads 94 of the resistors 90 via the contact points 98. Thus the contacts 116 and 118 perform the same selection function on the resistors 90 on the drum 88 as do the contacts 100 and 102; but where the contacts 100 and 102 switch a resistor in series between the second input signal source 153 and the second meter movement 156, the contacts 116 and 118 switch a resistor in series between the first source of input signals 157 and the first meter movement 154. In either case, the selection is made according to the rotation of the shaft 80 or 82 by its respective knob 54 or 56.

As was stated above, one problem with the shared-resistor system of the instant invention is that if the knob 54 and the ring 56 are rotated such that the contacts 100, 102, and the contacts 116, 118 are connected across the same resistor, the resulting output signals would be so greatly erroneous as to be absolutely worthless. In order to prevent such output signals from ever being produced by the inventive sensitivity selector system, the shaft 82 and the shaft 80 have respective members which cooperate together to perform a circuit breaking function should the two shafts be oriented to switch in the same resistor.

Accordingly, an arm 130 extends from the end of the shaft 80 perpendicular to the axis of the shaft 80. The arm 130 is mounted in cantilever form to the shaft 80 and is flexible, so that it can be sent in the downward direction. To cooperate with the arm 130 there is extended down from the arm 86 an arm 132 having a cam surface 134 mounted at the lower end thereof. The shape of the cam surface is such that as the ring 56 and knob 54 are rotated, either simultaneously or separately, the cam surface 134 will engage the free end 136 of the cantilever arm 130 and deflect the arm 130 downward. The arm 86 and the cantilever arm 130 are so positioned on their respective shafts 82 and 80 that the downward deflection of the free end 136 by the cam 134 will occur only when the shafts 82 and 80 are in position to cause their contacts 100, 102, and 116, 118 to share the same resistor 90.

Mounted on the arm 130 are two switches 138 and 140. The switch 138 has a first pole 142 and a second pole 144 mounted on the beam 141, and a movable contact 146 mounted therebetween on the cantilever beam 130. The second switch 140 has a first pole 148 and a second pole 150 mounted on the beam 141, and a movable contact 152 mounted therebetween on the beam 130. As will be explained in more detail in connection with FIG. 5, the first switch 138 is electrically connected in series with one of the input signal sources, while the second switch 140 is electrically connected in series with the meter movement corresponding to the input signal source with which the first switch is connected in series. The poles 142, 144, 148 and 150 are so arranged relative to the movable contacts, 146 and 152 that when the arm 130 is bent down by the cam surface 134 the movable contacts 146 and 152 will cease to provide electrical connections between the poles with which they are associated. Thus in effect when the cam surface forces down the free end 136, circuit breaking occurs both at the input and at the output of one pair of resistor contacts, either 100, 102 or 116, 118.

Referring to FIG. 5, the electrical wiring of the components discussed in FIG. 4 is shown schematically therein. The resistors 90 have their first leads 92 directly connected to two sets of contact points, the contact points 112 associated with the first input signal source and the contact point 96 associated with the second input signal source. The first input signal source is depicted at 151 while the second input signal source is depicted at 153. The movable slide associated with the first input signal source 151 is shown at 116 as in FIG. 4, while the movable slide associated with the second signal source 153 is numbered 100 consistent with its numbering in FIG. 4.

At the output side of the resistor bank comprising the resistors 90, the leads 94 are directly connected both to the contact points 98 associated with the second meter movement (hereinafter numbered 156) and with the contact points 114 associated with the first meter movement (hereinafter numbered 154). The movable contacts 102 and 118 are numbered as they were in FIG. 4. The first input 151 has a direct connection to the first meter 154 through a reference or common line 158, while similarly the second input 153 has a direct connection to the second meter movement 156 through a common reference line 159.

The schematic of FIG. 5 illustrates the electrical operation of a dual meter system using the sensitivity selection switch of the instant invention. The movable slides 116 and 118 which are essentially ganged as represented by the dotted lines 160 are closed to a desired pair of points 112, 114 determined by the value of resistance to be connected between the first input 151 and the first meter movement 154. At the same time, the movable slide pair 100, 102 which are also ganged as represented by dotted lines 162 slide independently of the first pair 116, 118 to contact whichever pair of contacts 96, 98 correspond to the desired resistor 90 to be connected in series between the second input 153 and the second meter movement 156.

As stated above in connection with the discussion of FIG. 4, in order to prevent distorted readings, it is necessary that one input source—meter movement pair be cut out of the circuit whenever the slides 100, 102 and 116 118 come to rest in electrical connection with the same resistor 90. In the exemplary circuit shown in FIG. 5, the input source 151 and the first meter movement 154 have been selected for disconnection, should a conflict in sharing a common resistor 90 arise. Therefore, the first switch 138 is connected in series between the first input source 151 and the movable slide 116, while the second switch 140 has been connected in series between the movable slide 118 and the first meter movement. As explained in connection with FIG. 4, the switches 138 and 140 are in some manner opened whenever the movable slides 100, 102 and 116 are rotated to select the same resistor 90.

From the discussion of FIGS. 4 and 5 it can be seen how two or more electrical meters can share the same sensitivity adjustment resistor bank, so that the adjustment knobs and indicator faces are coaxial and so that the bulk and expense of the overall sensitivity control is cut down to that of a prior art single meter sensitivity control. The broad concept of the system of FIGS. 4 and 5 is that the sensitivity control has a plurality of knobs which may or may not be mounted coaxially and has a single resistor (or other electronic component) bank associated with said knobs in such manner that each resistor in the resistor bank may be connected in series between each meter and its input signal source. Each separate control knob has its own separate set of contact means for placing its meter in a series circuit with each sensitivity resistor. The effect achieved is that each control knob can be rotated independently to select any resistor in the sensitivity control resistor bank for series electrical connection between a meter and its input signal source. As FIG. 5 illustrates, in the absence of electrical contact of the points 96, 98, 112 or 114, with the movable slides 100, 102, 116 and 118, the resistors 90 are electrically isolated. The result is that several meters may use different resistors 90 in the common resistor bank simultaneously without any adverse effects on the output readings.

The only limitation on the selection of resistors by the various meters 154, 156 (or more, if it is desired) is that they cannot use the same resistor 90 simultaneously. To prevent this occurring and producing erroneous signals, a system such as that used to open the switches 138, 140 may be provided as shown in FIG. 4. Alternatively, the operation of the switches 138, 140 may be left to the manual control of the personnel using a dual electric meter in which the common resistor bank principle is applied.

Referring to FIG. 6, the apparatus shown therein is another version of the circuit breaking equipment represented by the arm 130, the cam 134, and the switches 138 and 140 in FIG. 4. In the circuit breaker of FIG. 6, a ring 170 has an outer conductive member 172 and an inner conductive member 174 separated by an insulating strip 176. A first lead 178 connected to the outer conducting member 172 may be electrically connected to the first input signal source 151. A second lead 180 electrically connected to the inner conducting surface 174 may be electrically connected to the first meter movement 154.

Mounted on the shaft 80 (or, if preferred, the shaft 82) is a beam 182 which rotates with the shaft 80, but is free to rock back and forth using the shaft 80 as fulcrum. A first end 184 of the beam 182 carries two electrical pickups 186 and 188 which are positioned to pick up electrical signals from the outer conductive surface 172 and the inner conductive surface 174, respectively. A lead 190 connected to the pickup 186 conducts electrical signals from the pickup 186 to the movable slide 116, while a lead 192 connected to the pickup 188 conducts electrical signals therefrom to the slide 118. Thus when the pickups 186 and 188 are in electrical connection with the outer conducting member 172 and the inner conducting member 174, respectively, then electrical signals will flow from the input signal source 151 through the outer conducting member 172 to the pickup 186 and thence through the lead 190 to the movable contact 116. From the movable contact 116 the signal will be connected to whichever contact point 112 the movable contact 116 is in contact with. From the contact point 112 the signal will flow through a lead 192 into whichever resistor 90 has been selected for series operation with the first meter movement 154 and thence through the second lead 94 of that resistor to one of the contact points 114. From the contact point 114 the signal flows through the lead 192 to the pickup 188. The pickup 188 connects the signal to the inner conducting member 174 from which it is conducted by the lead 180 to the first meter movement 154.

As was stated above, the arm 182 is able to rock up and down to a certain degree. It is biased by a spring 194 into a position wherein the pickups 186 and 188 are in electrical contact with the ring 170. However, the application of a force (represented by the numeral 196) to a point 198 at the opposite end of the arm 182 from its first end 184 will depress the point 198 and raise the first end 184 to pull the pickups 186 and 188 out of electrical connection with the ring 170. The force 196 may be applied either manually or by cam action such as is applied by the cam surface 134 shown in FIG. 4. In either case, the raising of the pickups 186, 188 out of electrical connection with the ring 170 will break two circuits: first, the circuit running from the first input 151 through the lead 178, outer conducting member 172, pickup 186, and lead 190 to the movable slide 116. The second circuit that will be broken is that running from the movable slide 118 through the lead 192, the pickup 188, the inner conducting member 174, and the lead 180 to the first meter movement 154. Thus it can be seen that the apparatus of FIG. 6 serves the identical function of the arm 130, cam 134, and switches 138 and 140 shown in FIG. 4.

Referring to FIG. 7, a dual electric meter according to other features of the instant invention has an outer case 200 having a front face 202. Mounted on the front face 202 is an indicator arrangement 204 composed of a frame 206, a number of scales 208 within the frame 206, and indicator needles 210 actuated by two meter movements within the case 200. Mounted on the face 202 are first and second selector switches 212 and 214. The function of these selector switches 212 and 214 is to select the basic excitation signals, etc. used by each meter system. Two sets of electrical lead connection posts 216 and 218 are mounted on the face 202. The posts are used to attach leads whereby electrical signals are conducted into the meter system of FIG. 7. Associated with a first meter movement of the system of FIG. 7 is a knob adjustment 212 whereby the sensitivity of the meter may be switched from resistor to resistor in the manner discussed in connection with FIGS. 4 and 5. Likewise, attached to the second meter system is another knob 214 whereby a selection of sensitivity resistors 90 may be accomplished.

Referring to FIG. 8, the four parts (a) through (d) therein illustrate different arrangements of the indicating needles 210 and 211 and the indicia, scales and clear glass held in various positions by the frame 206. In FIG. 8(a) a first indicator needle 250 extends in front of a clear glass plate 252. Various indicia for the first indicator needle 250 may be mounted on the front of the clear glass plate 252 as shown at 254. A second indicator needle 256 may be mounted behind the clear glass plate 252; and a second set of indicia for use by this indicator needle may be mounted on the back portion of the clear glass plate 250. A white reflecting surface or mirror 260 for use by both needles 250 and 256 may be mounted behind the indicator needle 256.

In FIG. 8(b) another arrangement has a clear glass plate 270 forward of all the other apparatus and has a first indicator needle 272 mounted behind the clear glass plate. Indicia for the use of the indicator needle 272 may be mounted on the back of the clear glass plate 270 as shown at 274. A second indicator needle 276 may be mounted behind the first indicator needle 272 and a scale therefor or indicia therefor may be mounted behind the indicator needle 276 as shown at 278.

Referring to FIG. 8(c) another arrangement of indicator needles and other components of the readout portion of the electric meter of FIG. 7 disposes an indicator needle 280 at the very front of the readout and a clear glass plate 282 therebehind. Indicia 284 for the indicator needle 280 may be mounted on the front of the clear glass plate 282. An indicator needle 286 is mounted behind the clear glass plate and a scale for use by the indicator needle 286 is shown at 288.

Referring to FIG. 8(d), the readout shown there has provision for four indicator needles 290, 292, 294, and 296, in situations where more than two meter movements are used in one assembly of the sort shown in FIG. 7. In the arrangement shown in FIG. 8(d), the two needles 290 and 292 come before a clear glass plate 298 and have their indicia for readout scales marked at 300 and 302, respectively. The other two needles 294 and 296 are disposed behind the clear glass plate and have their indicia marked on a scale at the far back of the readout display as shown at 304. Other arrangements of the needles are conceivable, but those disclosed herein have been found most workable in actual practice. All such arrangements are within the principles of the invention disclosed relating to dual meter readout displays.

Referring to FIG. 9, the apparatus shown there has for its purpose the provision of an indication to the operator of a dual electric meter of the sort disclosed herein when a meter input such as that at 151 and a meter movement such as that at 154 are cut out by displacement of the movable contacts 146 and 152 due to orientation of the knobs 54 and 56 to select the same resistor 90. Since an operator might be confused and make erroneous readings if he did not have an indication that one meter movement was no longer operating, it might often be desirable to provide a system such as that shown in FIG. 9. The system of FIG. 9 has the great advantage over the numerous possible electrical indication systems that it does not require electrical power. Since electrical power is derived from batteries and is at a great premium in most electrical meter systems, the use of the mechanical systems either of FIG. 9 or of FIG. 10 is a great advantage. Such an indication system would have an outer shaft 350 fixed to rotate with the knob 56, while an inner shaft 352 is fixed to rotate with the knob 54. A disk 234 rotating with the outer shaft 350 carries a cam arm 356 at the lower end of which is mounted a cam surface 358. As the knob 56 is rotated, the cam surface 358 is rotated around the axis of the shafts 350 and 352.

A disk 360 is keyed to rotate with the shaft 352 while still permitting coaxial movement of the disk 360 with the shaft 352. A deflection arm 362 is affixed to the disk 360 at its first end 364, while its second end 366 rides on a flange 368 affixed to a cylindrical wall 370 surrounding the mechanism. The arm 362 has some spring tension in it to keep the end 366 firmly in contact with the flange 368. The deflection arm 362 is positioned such that as the cam 358 passes it in the course of the rotation of either the knob 54 or the knob 56 or both together, the cam 358 will force the deflection bar 362 down. Since the deflection bar 362 cannot deflect downward at its second end 366, the first end 364 and the disk 360 absorb the deflection caused by the cam 358 in lever fashion, with the end 366 as the fulcrum.

The lower end 372 of the shaft 352 has a loose fitting cylinder 374 mounted on it, upon which the disk 360 rests. Thus when the disk 360 is deflected due to action of the cam 358, it pushes down against the cylinder 374, causing the cylinder 374 to deflect downward. The cylinder 374 is biased upward by a spring 376, first pushing the arm 384, which in turn pushes up on the cylinder 374. A pin 375 limits upward travel.

The preferred method of providing an indication of circuit disconnection due to coincident orientation of the knobs 54 and 56 is by a lever 380 having a fulcrum 382 and having a first end 384 mounted to deflect with cylinder 374. A second end 386 of the lever 380 is connected through a rod 388 to a visual display cylinder 390 through a rack and pinion arrangement consisting of a gear rack 392 on the rod 388 and a pinion 394 mounted to be rotated by deflection of the rack 392 and mounted on a shaft 396 which also bears cylinder 390.

In the operation of the mechanism of FIG. 9, rotation of the knobs 54 and 56, either one separately or together, will cause the first disk 354 to rotate or the second disk 360 to rotate. In such case, the cam surface 358 and the deflection rod 362 will come in contact. It should be noted that the cam surface is so shaped that it can approach the deflection rod from either direction and still exert cam action thereon. When the cam action from the cam surface 358 causes the deflection rod 362 to push downward, the end 366 of the deflection rod 362 acts as a fulcrum and causes the end 364 to be levered downward, thereby deflecting the disk 360, thence cylinder 374, thence the lever 380, and ultimately the connecting rod 388. The deflection of the rod 388 causes the rack 390 to rotate the pinion 394, thereby causing an "in" indication 398 to come into view of the operator of the electrical meter system and an "out" indication 400 to be moved into the operator's view. Thus, without the use of electrical power, the orientation of the knobs 54 and 56 is transduced into a visual indication at 390 of the state of the movable contacts 146 and 152 (i.e., whether meter 154 is "in" or "out" of the circuit).

The indication of the meter 154 being "in" or "out" as shown at 390 may be accomplished by any of a number of mechanisms, such as gears, rubber belts, chains, cords, wire drive, or any other mechanical linkage.

FIG. 10 shows a similar system to that of FIG. 9, but the ultimate readout of the FIG. 10 system is the appearance through an opening 410 in the center of the knob 54 of an indicator 412, preferably colored or the like to attract the attention of the operator of the electrical meter. The indicator 412 is mounted at the upper end of a shaft 414 which runs coaxial and inside both the shaft 350, as discussed above, and the shaft 352. A similar cam disk 354, arm 356, and cam surface 358 are attached to rotate with the shaft 350. The disk 360 which rotates with the shaft 352 has a different attachment, however. Attached to its periphery is an arm 416 which extends downward to provide the fulcrum for a lever 418 which has a surface 420 disposed to contact the cam surface 358 whenever the knobs 54 and 56 are oriented to cause the meter movements 154 and 156 to share the same resistor 90. Deflection of the surface 420 by the cam surface 358 causes the lever 418 to rotate about its fulcrum 422 and thus push the shaft 414 in the upward direction so that the indicator end 412 extends through the opening 410. This occurs because the shaft 414 terminates in an end 424 of the lever 418 opposite to the surface 420. The end 424 of the lever 418 is biased downward (and thus so is the shaft 414) by a spring 426.

A reference to FIG. 11 will show in greater detail the arrangement in cooperation of the knob 54, the knob 56, the shaft 352 keyed to the knob 54 at 430, and the shaft 350 keyed to the knob 56 at 432. The indicator end 412 is shown extended into the opening 410 in the knob 54 to show that meter 154 is out of the circuit.

Referring to FIG. 12, a dual electrical meter system in which the mechanical readout movement cut-out indicator of FIG. 9 might be used has a case 450, a first needle 452 associated with the first meter movement (not shown) and a second needle 454 associated with the second meter movement (not shown). The needles 452 and 454 are disposed in front of a readout face 456 on which scales 458 are marked. It should be noted in connection with FIG. 12 that where a single resistor bank is used as taught by the instant invention, only one scale need be marked on the surface 456. On the other hand, if the resistor bank of FIG. 4 is connected in series with other variable sensitivity resistors, a number of scales could be utilized depending on what value of resistance was connected in series with the resistor bank of FIG. 4.

Much as discussed above, input signals to the first meter movement are applied to the dual meter system of FIG. 12, as indicated generally at 460, while input signals to the second meter movement associated with the needle 454 are applied as indicated generally at 462. A first knob 54 and a second knob 56 are used just as discussed above, and they may share the same scale markings 64 as indicated in the discussion of FIG. 3. Adjacent the knobs 54 and 56 is the readout shown at 390 of FIG. 9. The cylinder 390 may have written on it "on" or "off," or, alternatively, "in" or "out," or any other words to indicate that the meter movement 154 is in circuit or out of circuit, or operating or not operating. Moreover, the cylinder 390 may be a flag that either covers words affixed therebehind or may bear the words themselves into view through a window in the face 464 of the case 450. In any event, the mechanism of FIG. 9 is well adapted to provide right adjacent to knobs 54 and 56 a good indication of whether the meter movement associated with the cut-outs 138 and 140 is indeed cut in or cut out of operation.

In summary, applicant has disclosed herein an improved dual meter system whereby ease of manufacture and minimum complexity of readout faces and controls is enhanced by the portion of commonality of components wherever possible. Thus the inventive dual electric meter has a common sensitivity selection system; and although this system was illustrated for use with two meter movements for purposes of simplicity, it can be appreciated that any number of meter movements could share the same resistor bank without going beyond the scope of the invention as herein disclosed. By the same token, the principles of disposing needles, indicia and scale faces relative to one another as discussed in connection with FIG. 8 go beyond the preferred arrangements shown therein.

Although the invention has been disclosed in its preferred form with a certain degree of particularity, it should be understood that the present disclosure of the preferred form has been made only by way of example and that numerous changes in the details of construction and the combination and arangement of parts may be resorted to without departing from the spirit and scope of the invention as hereinafter claimed.

I claim as my invention:

1. In combination:

a meter having first and second dials and having a first indicator movable along the first dial to provide a variable indication of a first parameter and having a second indicator movable along the second dial to provide a variable indication of a second parameter, first means adjustable to different positions to provide a variable sensitivity to the indications provided by the position of the first indicator relative to the first dial, second means adjustable to the different positions to provide the variable sensitivity to the indications provided by the position of the second indicator relative to the second dial, and third means operatively coupled to the first and second means for obtaining an indication by both of the first and second means upon an adjustment of the first and second means to provide different sensitivities for the indications by the first and second indicators and for obtaining an indication by only a particular one of the first and second means upon an adjustment of the first and second means to provide similar sensitivities for the indications by the first and second indicators.

2. The combination set forth in claim 1 wherein the first means includes a plurality of impedances each having an individual and progressive value relative to the values of the other impedances in the plurality and wherein the second means also includes the plurality of impedances and wherein the third means obtains an indication by only the particular one of the first and second means when the first and second means select the same impedance in the plurality.

3. In combination:

a meter having first indicia for providing indications of a first parameter and having a first indicator movable relative to the first indicia for providing a variable indication of the first parameter and having second indicia for providing indications of a second parameter different from the first parameter and having a second indicator movable relative to the second indicia for providing a variable indication of the second parameter, first means including a first switch adjustable to a plurality of different positions for controlling the sensitivity of the indication of the first parameter, second means including a second switch adjustable to a plurality of different positions for controlling the sensitivity of the indication of the second parameter, and third means operatively coupled to the first and second means for obtaining an indication by both the first and second indicators upon adjustments of the first and second switches to different sensitivites and for obtaining an indication by only a particular one of the first and second indicators upon adjustments of the first and second switches to the same sensitivity.

4. The combination set forth in claim 3 wherein the first means includes a plurality of impedances each having an individual value and wherein the first switch is adjustable to select individual ones of the impedances in the plurality to control the sensitivity of the indication of the first parameter and wherein the second means includes the plurality of impedances and wherein the second switch is adjustable to select individual ones of the impedances in the plurality to control the sensitivity of the indication of the second parameter.

5. In a sensitivity selector system for varying the attenuation of electrical signals from at least a pair of electrical signal sources to produce variation in the sensitivity of at least a pair of electrical meters individually measuring the respective electrical signals from the sources, a plurality of impedances each having first and second ends and first and second leads attached to the first and second ends, respectively, said impedances being chosen of such value as to provide a plurality of different attenuations for electrical signals passing therethrough, a plurality of first electrical contact points individually connected to the first leads of said impedances, a plurality of second electrical contact points individually connected to the second leads of said impedances, at least a pair of first movable contacts, each electrically connected to an individual one of the signal sources, said first movable contacts being constructed to selectively close with each of said first electrical contact points to provide an electrical circuit between the signal source connected to each said first movable contact and the impedance connected to the first contact point with which each respective first movable contact is closed, at least a pair of second movable contacts each electrically connected to an individual one of the electrical meters, said second movable contacts being constructed to selectively close with each of said second electrical contact points to provide an electrical circuit between the electrical meter connected to each said second movable contact and the impedance connected to the second contact point with which each respective second movable contact is closed, at least a pair of manually actuatable means for individually moving the first movable contacts and the second movable contacts into electrical contact with selected ones of the first and second contact points, and means for breaking the circuit between at least one electrical signal source and its associated electrical meter when more than one of the first movable contacts is closed to the same first contact point.

6. The sensitivity selected system of claim 5 wherein said means for breaking the circuit includes:

a first switch electrically connected between a first one of the electrical signal sources and the first movable contact associated with said first electrical signal source, a second switch electrically connected between a first one of the electrical meters for measuring signals from the first electrical signal source and the second movable contact associated with said first electrical meter, and means for opening said first and second switches whenever said first electrical signal source and said first electrical meter are sharing the same impedance in the plurality with the other electrical signal source and meter.

7. The sensitivity selector system of claim 6 wherein said switches have first contacts mounted upon a cantilever arm and have second contacts normally engaging the first contacts and wherein the cantilever arm is displaced to cause said switches to open when the pair of manually actuatable means are operated to cause the signal sources to share the same one of said impedances.

8. The sensitivity selector system of claim 5 wherein said circuit breaking means includes:

a first conductive member and a first pickup connected between a first one of the electrical signal sources and its associated first electrical contact, a second conductive member and a second pickup connected between a first one of the meters and its associated second electrical contact, and means for respectively moving the first and second pickups out of electrical connection with the first and second conductive members whenever the other signal source is connected to the same impedance as the first signal source.

9. The sensitivity selector system of claim 5 wherein means are provided for indicating whether or not said second means are breaking the circuit between one of the electrical signal sources and its associated electrical meter.

10. In combination in a dual electric meter system for measuring electrical signals from first and second electrical signal sources to produce variations in the readings of first and second electrical meters measuring the respective first and second electrical signals, a case, a plurality of impedances mounted within the case, each said impedance having first and second ends and first and second leads respectively attached to the first and second ends, said impedances being chosen of such value as to provide a plurality of different attenuations for electrical signals passing through the impedances, a plurality of first electrical contact points disposed within the case respectively connected to the first leads of said impedances, a plurality of second electrical contact points disposed within the case respectively connected to the second leads of said impedances, first and second movable contacts respectively connected electrically to the first and second signal sources, said first and second movable contacts being constructed to selectively close with each of said first electrical contact points to provide an electrical circuit between the associated one of the first and second sources and the impedance connected to the first contact point with which the respective one of the first or second movable contacts is closed, third and fourth movable contacts respectively connected electrically to the first and second electrical meters, said third and fourth movable contacts being constructed to selectively close with each of said second electrical contact points to provide an electrical circuit between the associated one of the first and second electrical meters and the impedance connected to the second contact point with which the respective one of the third and fourth movable contacts is closed, first and second manually actuatable means extending through the case for respectively moving the first and second movable contacts and the third and fourth movable contacts into electrical contact with selected ones of the first and second contact points, such that the first electrical signal source is connected through one of said impedances to the first electrical meter and the second electrical signal source is connected through one of said impedances to the second electrical meter, first and second readout means mounted in the case in position to be viewed from outside the case and respectively responsive to the signals passing through the first and second movable contacts and the third and fourth movable contacts for providing indications of such signals, the manually actuatable means including two knobs respectively mounted on two rotatable coaxial shafts, the first one of the shafts having the first and second electrical contacts mounted thereon for rotation with the first shaft and the second one of the shafts having the third and fourth electrical contacts mounted thereon for rotation with the second shaft, and means for breaking the circuit between one of the electrical signal sources and its associated electrical meter when the first and second movable contacts are closed to the same contact point in the plurality.

11. The dual electric meter system of claim 10 wherein each of the first and second manually actuatable means respectively associated with the first and second electrical meters operates independently to close its associated first and second electrical contacts with selected ones of the first and second electrical contact points regardless of the electrical contact points being selected by the other actuatable means.

12. The dual electric meter system of claim 10 wherein said first and second readout means respectively include first and second needles and a glass plate and wherein said first needle is forward of said glass plate and said second needle is behind said glass plate.

13. The dual electric meter system of claim 10 wherein said first and second readout means respectively include first and second needles and a glass plate and wherein said first needle is forward of said glass plate and said second needle is behind said glass plate and indicia for said first needle are marked on the front of said glass plate and indicia for said second needle are marked on the back of said glass plate.

14. The dual electric meter system of claim 10 wherein said first and second readout means respectively include first and second needles and a glass plate and a surface displaced from the glass plate and to the rear of the glass plate and wherein said first needle is forward of said glass plate and said second needle is behind said glass plate and wherein indicia for said first needle are marked on said glass plate and indicia for said second needle are marked on said rear surface.

15. The dual electric meter system of claim 10 with the addition that the readout means includes a first needle actuated by the first electrical meter, a second needle actuated by the second electrical meter, a glass plate and a rear surface displaced from the glass plate and said needles are mounted between said glass plate and said rear surface, with indicia for said first needle being disposed on said glass plate and indicia for said second needle being disposed on said rear surface.

16. In combination:
a meter having first indicia for providing indications of a first parameter and having a first indicator movable relative to the first indicia for providing a variaable indication of the first parameter and having second indicia for providing indications of a second parameter different from the first parameter and having a second indicator movable relative to the second indicia for providing a variable indication of the second parameter,
a plurality of sensitivity-varying components,
first means adjustable to a plurality of different values for selecting individual ones of the sensitivity-varying components to control the sensitivity of the indication of the first parameter, and
second means adjustable to a plurality of different values for selecting individual ones of the sensitivity-varying components to control the sensitivity of the indication of the second parameter,
said first and second means having independent adjustment mechanisms but sharing the same sensitivity-varying components, the sensitivity-varying components constituting a plurality of impedances each having an individual value and the first means being adjustable to select individual ones of the impedances in the plurality to control the sensitivity of the indication of the first parameter and the second means being adjustable to select individual ones of the impedances in the plurality to control the sensitivity of the indication of the second parameter and means being provided for obtaining the operation of only the first means when the first and second means are adjusted to select the same impedance in the plurality.

References Cited

UNITED STATES PATENTS

| 2,478,966 | 8/1949 | Gilbert | 324—115 |
| 2,657,357 | 10/1953 | Rosso | 324—115X |
| 2,325,179 | 7/1943 | Doering | 324—115 |
| 2,466,558 | 4/1949 | Saldon | 324—115 |

FOREIGN PATENTS

| 510,251 | 7/1939 | Great Britain | 324—115 |
| 764,623 | 5/1934 | France | 324—114 |

RUDOLPH V. ROLINEC, Primary Examiner

E. F. KARLSEN, Assistant Examiner

U.S. Cl. X.R.

324—114, 143